(12) United States Patent
Chan et al.

(10) Patent No.: US 8,164,848 B2
(45) Date of Patent: Apr. 24, 2012

(54) SNUBBER FOR DISC DRIVE FOR PREVENTION OF USER REPORTED DEFECTS

(75) Inventors: ChuanKong Chan, Singapore (SG); LeongCheng Tan, Singapore (SG); Jenny Loo, Singapore (SG); Jeen Hoong Casey Seto, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 583 days.

(21) Appl. No.: 12/353,578

(22) Filed: Jan. 14, 2009

(65) Prior Publication Data

US 2010/0177438 A1 Jul. 15, 2010

(51) Int. Cl.
*G11B 17/00* (2006.01)

(52) U.S. Cl. ................. 360/97.01; 360/97.02; 360/265.1

(58) Field of Classification Search .... 360/97.01–97.04, 360/133, 265.1, 256.2, 256.4
See application file for complete search history.

(56) References Cited

U.S. PATENT DOCUMENTS

| 7,130,149 | B2 | 10/2006 | Hong et al. | |
|---|---|---|---|---|
| 7,307,811 | B2 * | 12/2007 | Xu et al. | 360/97.01 |
| 7,310,199 | B2 | 12/2007 | Pottebaum et al. | |
| 2006/0176608 | A1 * | 8/2006 | Xu et al. | 360/97.01 |

* cited by examiner

*Primary Examiner* — Gene Auduong
(74) *Attorney, Agent, or Firm* — Hall Estill Attorneys at Law

(57) ABSTRACT

A disc drive snubber for protection of a disc drive disc from mechanical shock, the snubber positioned to limit the deflection of the disc in the operational mode, the position of the disc snubber determined in response to user reported defects. The snubber, positioned beneath the disc in near proximity to the outer diameter of the disc, extends along about a 60 degree segment of the disc and is made of a FIPG material.

20 Claims, 4 Drawing Sheets

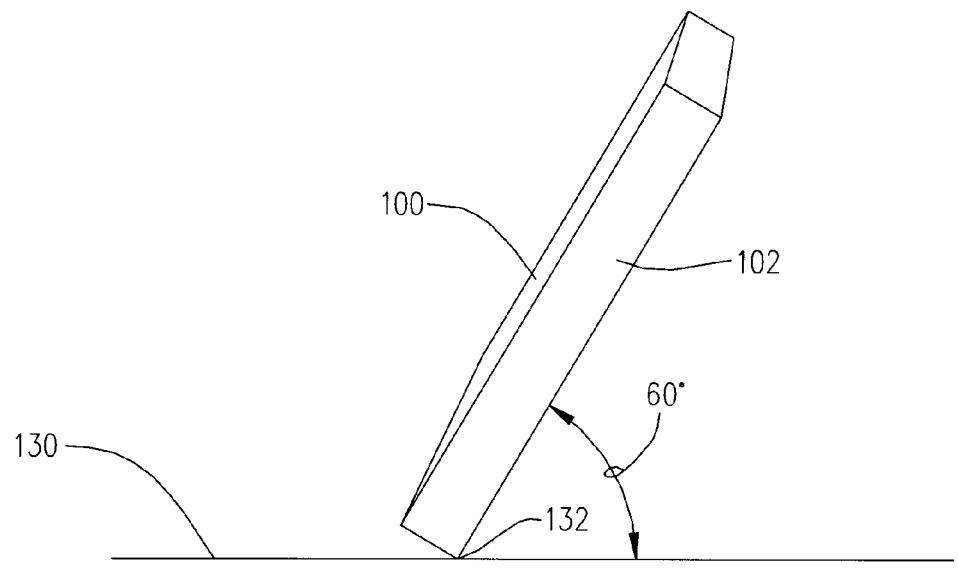
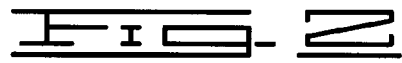
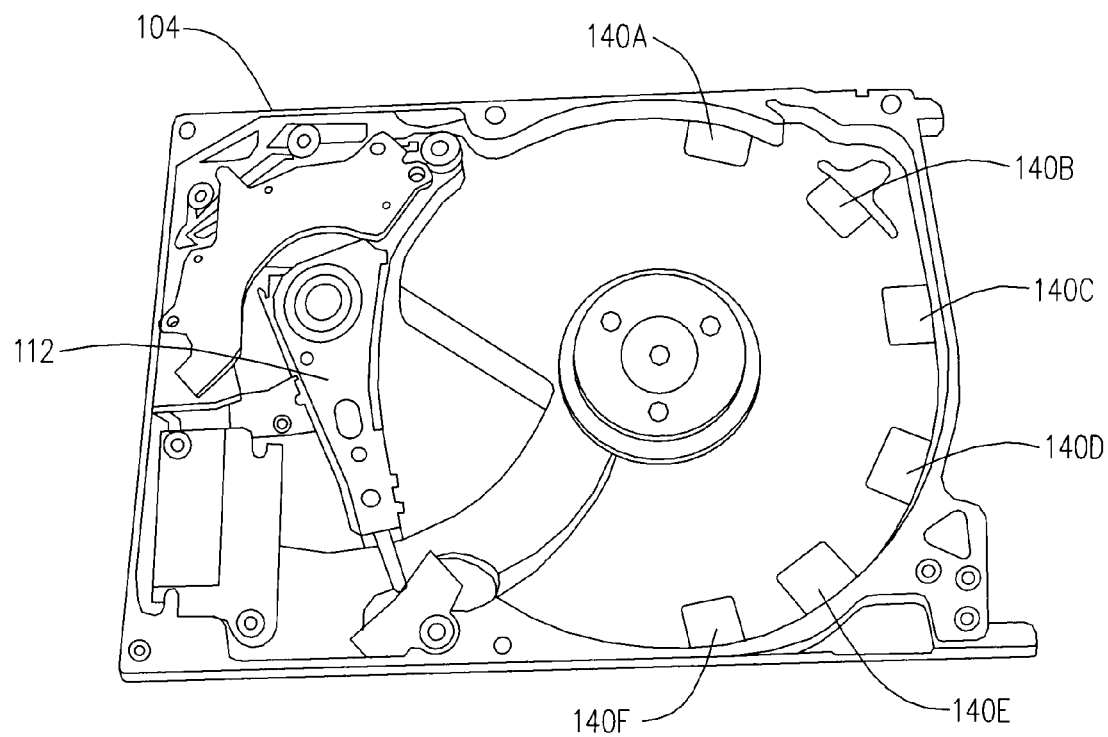
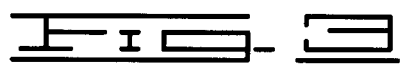

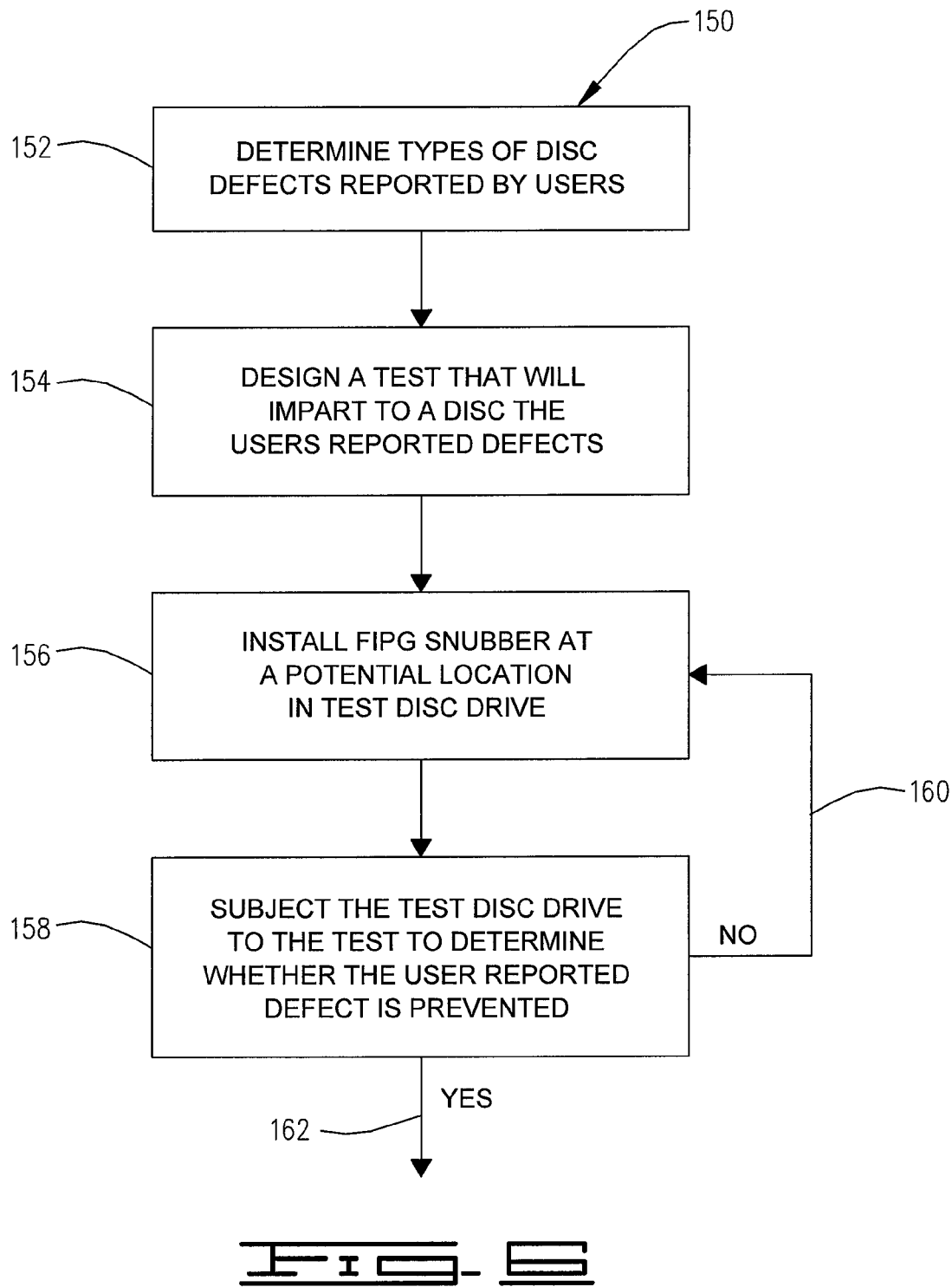

US 8,164,848 B2

SNUBBER FOR DISC DRIVE FOR PREVENTION OF USER REPORTED DEFECTS

BACKGROUND

Disc drives are digital data storage devices that store and retrieve large amounts of user data in a fast and efficient manner. Data are magnetically recorded on the surfaces of one or more data storage discs affixed to a spindle motor for rotation at a constant high speed.

An array of vertically aligned data transducing heads are controllably positioned by an actuator to read data from and write data to tracks defined on the disc recording surfaces. An actuator motor rotates the actuator to move the heads across the disc surfaces. The heads are suspended from gimbal assemblies extending from arms of the rotary actuator assembly and include aerodynamic features that enable the heads to fly upon a fluid air bearing established by currents set in motion by the rotation of the discs. When the disc drive is deactivated, a shutdown operation is commenced wherein the heads are moved to a safe parking position before the discs come to a stop.

It is a continuing trend in the disc drive industry to provide disc drives with ever increasing data storage capacities using the same or smaller form factor (i.e., outside dimensions) for the drives. As a result, successive generations of drives are often provided with discs that are closer together, reducing disc to actuator arm clearances. At the same time, disc drives are being utilized in harsher environments, such as portable computers, requiring increases in the robustness of the drives to withstand ever greater external vibration and shock input levels. For example, a typical disc drive might be required to withstand up to 200 g mechanical shock.

Such mechanical shocks can cause significant deflection of the discs, leading to catastrophic damage to the disc media and heads. More particularly, disc to actuator arm contact can induce a shock wave large enough for referral to the gimbal assemblies and heads, causing the heads to flex off the landing zones as a result of the relatively flexible gimbal assemblies. The heads can thus achieve significant velocities in accelerating from and back toward the discs. When such velocities are sufficiently severe, damage can occur to the heads and the disc surfaces as the heads strike landing zones. Moreover, the corner of a tilted head can strike the disc surface, increasing probability of damage to the head or to the disc.

While prior art disc snubbers have limited deflection of disc drive discs, it has been observed that localized snubbers can be displaced upon application of a mechanical shock. In a relatively small computer such as a laptop, where space is limited, the added cost of assembly and installation of extra pieces can defeat the purpose of a low cost, space efficient computer.

Accordingly, there is a need for an improved approach to minimizing damage to a disc drive as a result of non-operational shock by limiting the ability of the discs to contact the arms and heads of an actuator of the disc drive.

SUMMARY

A disc drive assembly data storage device having a rotatable disc in an operational mode that has at least one disc snubber that is positioned to limit the deflection of the discs in the operational mode of the disc drive assembly data storage device, the position of the disc snubber being determined in response to user reported defects. The snubber is preferably positioned beneath and in near proximity to the outer diameter of the disc and extending along about a 60 degree segment of the disc. Preferably, the snubber is made of a flow in place gasket (FIPG) material.

In one preferred embodiment the disc drive has a cavity track, and the snubber is formed with a lower portion extending into the cavity track.

These and various other features and advantages which characterize the claimed invention will become apparent upon reading the following detailed description and upon reviewing the associated drawings.

BRIEF DESCRIPTION OF THE DRAWINGS

FIG. 2 depicts a topple drop shock test.

FIG. 3 is a planar view in perspective of the base deck of the data storage device of FIG. 1.

FIG. 6 depicts the steps of a method of determining the characteristics and position of a snubber for prevention of user reported defects to a data storage device such as shown in FIG. 1.

DETAILED DESCRIPTION

Accordingly, there is a need for an improved approach to minimizing damage to a disc drive as a result of non-operational shock by limiting the ability of the discs to contact the arms and heads of an actuator of the disc drive.

It has been observed that the majority of the disc defects occurring as a result of non-operational shock in certain disc drives are attributable to ramp disc contact, resulting in unacceptable head disc interference. In fact, studies have shown that 30 to 40 percent of such defects fall within this category of causation. Such defect rates have motivated the study of the failure cause of ramp disc contact, and the present invention provides solutions for such.

Ramp disc contact is defined as deflection of a disc edge in the Z axis (with the disc rotatable in the XY plane) so as to contact the ramp. Discs are especially susceptible to this type of deflection when the disc drive incurs free topple drop shock while the disc is in the operating mode. The points of contact can shed off ramp materials that tend to deposit on the outer edge of the disc in the form of a unique signature or footprint. The resulting ramp debris has a high tendency of being caught under the head slider during loading and unloading operations, and result in media defects and further head disc interference.

Figure 1:
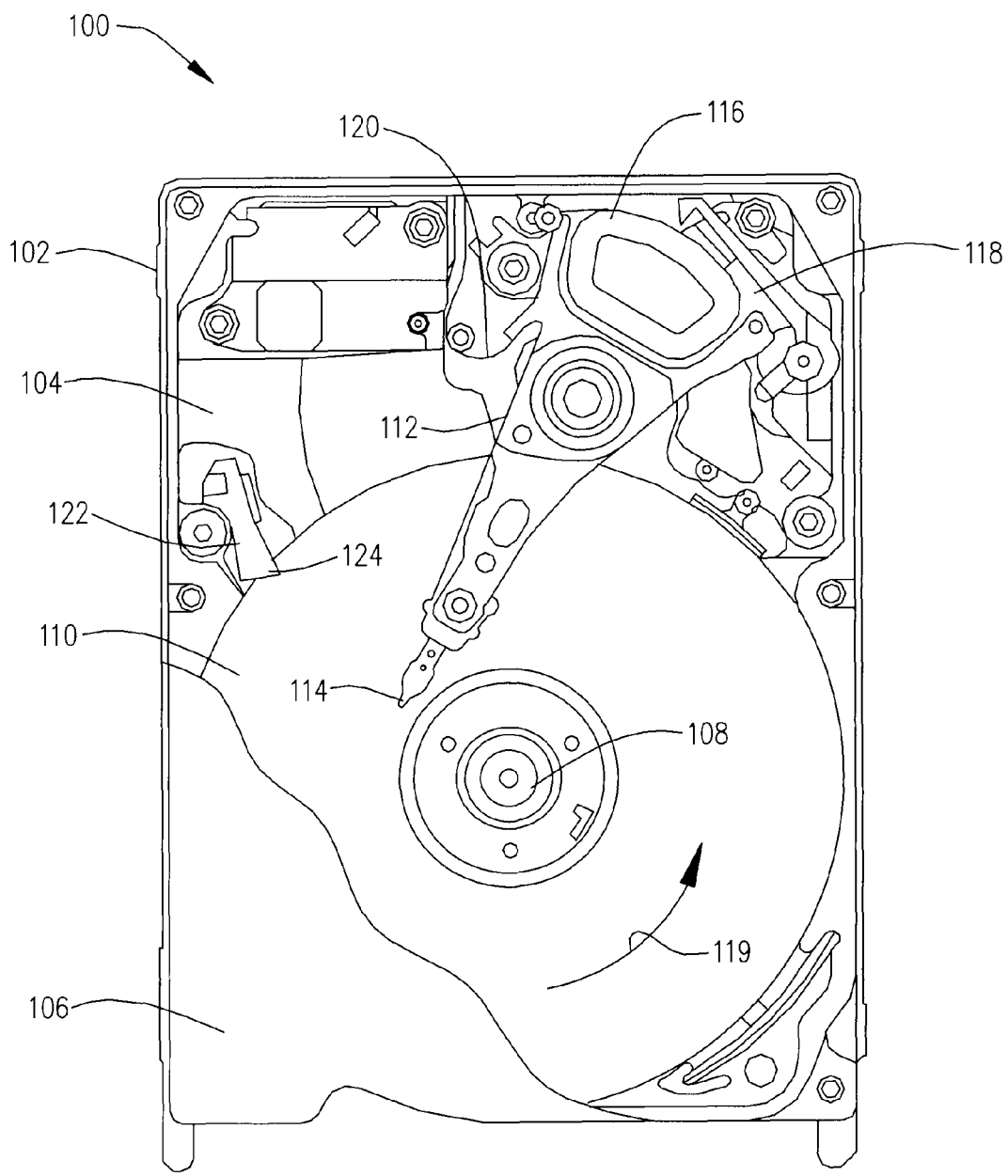
FIG. 1 is a top plan view of a data storage device of the type in which preferred embodiments of the snubber of the present invention is particularly useful for the prevention of defects caused by mechanical shock.

The embodiments of the present invention have demonstrated that ramp disc contact can be eliminated or greatly mitigated. FIG. 1 provides a top plan view of a data storage device 100 constructed in accordance with preferred embodiments of the present invention. The data storage device 100 is preferably characterized as a disc drive which magnetically stores digital data.

The disc drive assembly 100 includes a housing 102 which defines an internal environment for the drive. The housing 102 has a base deck 104 and a top cover 106 (shown partially cutaway). A spindle motor 108 supported within the housing 102 rotates a number of magnetic recording discs 110 at a constant, high speed. A rotary actuator 112 controllably moves a corresponding number of data transducing heads 114 across recording surfaces of the discs 110 through application of current to a coil 116 of a voice coil motor (VCM) 118.

The high speed rotation of the discs 110 in the operational mode generates fluidic currents generally denoted by arrow 119, and the heads 114 are aerodynamically supported over the recording surfaces by fluidic currents established by rotation of the discs 110. It is contemplated that the disc drive assembly 100 can include one or more discs 110, and one head 114 for each side of each disc.

A flex circuit assembly 120 provides electrical communication paths between the actuator 112 and a printed circuit board assembly (PCBA) mounted to the underside of the base deck 104. When the disc drive assembly 100 is in a non-operating mode, the heads 114 are brought to rest onto a load/unload ramp 122 supported by the base plate 104 near the outermost diameters of the discs 110; a latch 124 secures the actuator 112 in a parked position on the load/unload ramp 122. Fasteners (not shown) extend through the top cover 106 and into receiving apertures (not shown) in the base deck 104 to secure the top cover 106 thereto.

Ramp disc contact causing potential head disc interference related defects were studied in certain hard disc drives. FIG. 2 shows a diagrammatical representation of a simulated test of the result of the disc drive assembly 100 being tumbled onto a hard surface. The disc drive assembly 100 is supported by a surface 130 on a corner 132 of the housing 102 and is inclined at a 60 degree angle. The purpose of the simulation was to duplicate ramp disc contact to determine its contributing factor.

From the position of the disc drive assembly 100 depicted in FIG. 2, a series of disc drives 100, without the benefit of being equipped with the present invention, were topple dropped from rest at 60° and allowed to come to rest on the surface 130 multiple times on each of the x- and y-axes. It was determined that if the cumulative impact shock level experienced by each drive from such multiple drops exceeds about 200 g's, the resultant damage would adequately set a base line from which the present invention could be evaluated.

After the drives 100 were subjected to the multiple topple drop test, the drives were disassembled and discs were analyzed using a Candela® disc laser scanning machine for inspection of the defects. (Candela is a registered trademark of KLA-Tencor Technologies Corporation of Milpitas, Calif.) The scans showed ramp disc contact markings on the disc edges and several particle scratches. These and other defect signatures provided clear footprints as to the source of the defects, thus marking same with that reported as field failures.

To ensure that the ramp disc contact was the result of the shock imparted during the topple drop tests described above, other possible causes, such as manufacturing processes, were evaluated on identical drives not submitted to the topple drop tests. This evaluation showed that the defect signatures were different, verifying that the defect signatures from the topple drop tests could be relied upon as a baseline representing field reported defects from externally generated shocks.

With these results at hand, it was undertaken to design a disc snubber that would minimize disc deflection of the type that causes ramp disc contact. As depicted in FIG. 3, several snubber locations 140A through 140F were designated on the base deck 104 and disposed radially at the outer edges of the discs (the discs are removed in FIG. 3). At each of these locations a snubber pad 142 was adhered to the base plate. Each of the snubber pads was made of FIPG (flow in place gasket) material, the thickness of which being that as necessary to provide a clearance gap of approximately 0.020 inch (this gap dimension will be determined by the clearance necessary for free rotary movement of the discs 110 while preventing disc ramp contact upon deflection of the discs 110 to the degree determined by the topple drop tests above).

FIPG material is readily available, lends itself to predictable manufacturing, and is thermally and chemically stable. Most importantly, because of the elasticity of FIPG material, it does not disintegrate easily when contacted by the spinning discs 110 upon deflection of same. One acceptable FIPG material is QAN TX-09 epoxy available from SJP Sealing Technology (S) Pte. Ltd of Singapore. The FIPG material, once dispensed in position, is oven air cured.

With the snubbers installed at the locations 140A-F in FIG. 3, several of the disc drives 100 were assembled and those disc drives were subjected to the topple drop tests described above with respect to FIG. 2. After the drives 100 were subjected to the multiple topple drop test, the drives were disassembled and the discs were analyzed in the manner described above using the Candela® disc laser scanning machine for inspection of the defects.

Figure 4:
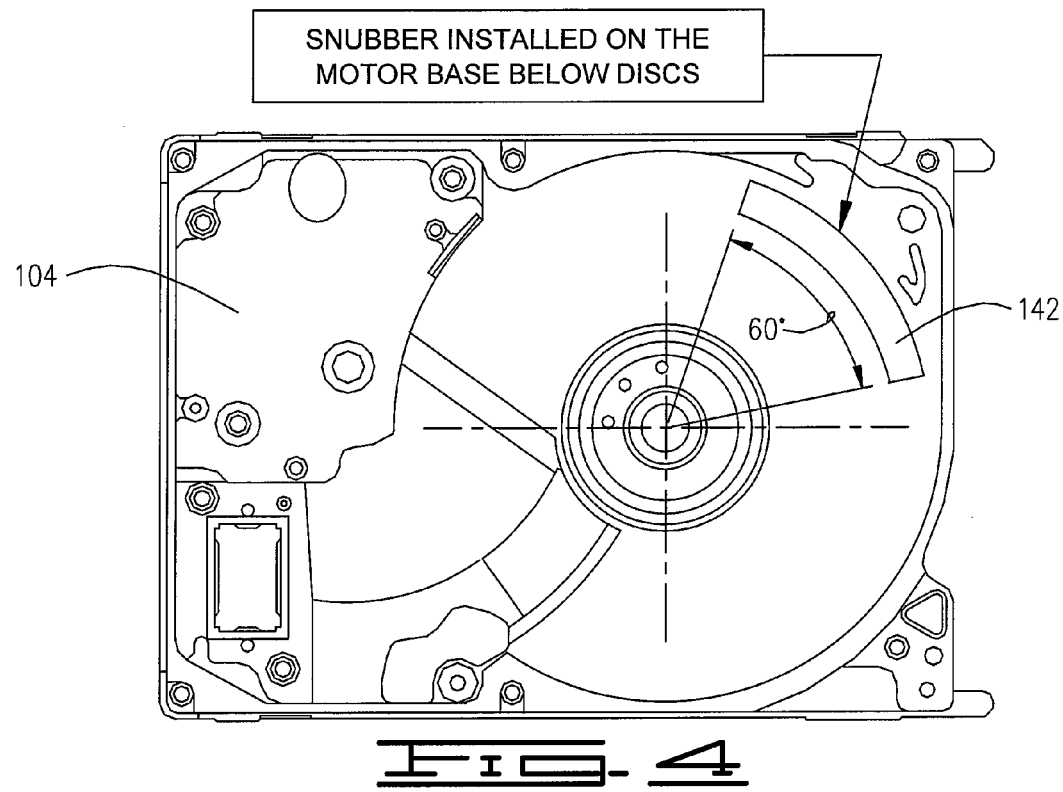
FIG. 4 is a plan view of the base deck of FIG. 3 showing a preferred location of the snubber.

These experiments showed that, when the disc drive assemblies 100 were equipped with the snubbers 142 and submitted to the 60 degree semi-constraint topple drop shock test depicted in FIG. 2, no evidence of ramp disk contact was found. These shock drop tests were repeated with various locations of multiple and single base plate mounted snubbers 142, and it was found that adequate protection of the disc drive assembly 100 could be achieved using a single snubber 142 as shown in FIG. 4. Shown in this figure is the base plate 104 having formed thereon a single snubber 142 that is disposed at the outer edge of the disc 110 (not shown in FIG. 4) and having an effective length to support the outer edge along about a 60 degree segment of the disc circumference.

The location of this 60 degree segment is not believed to be critical, and the location where the snubber 142 is to be installed can be selected from those physical locations on the base plate 104 where adequate space is available. In the disc drive assembly 100 as shown, the snubber 142 is conveniently located in a corner of the base plate 104 where a re-circulation filter will be located; in other disc drive layouts, this location may or may not be optimum. It should be noted that the present invention is not restricted to a single disc hard disc drive, as the deflection of the discs noted herein is that of the entire disc pack, since the discs are all mounted on the spindle motor and act like a homogenous body and deflect together. Thus, dampening deflection of the bottom disc is imparted to the entire disc pack.

The thickness dimension of the snubber 142 can readily be adjusted, and the thickness will usually be established at a dimension so that the desired gap will occur between the bottom disc and the top surface of the snubber 142 at the outer disc diameter near the load/unload ramp.

Figure 5:
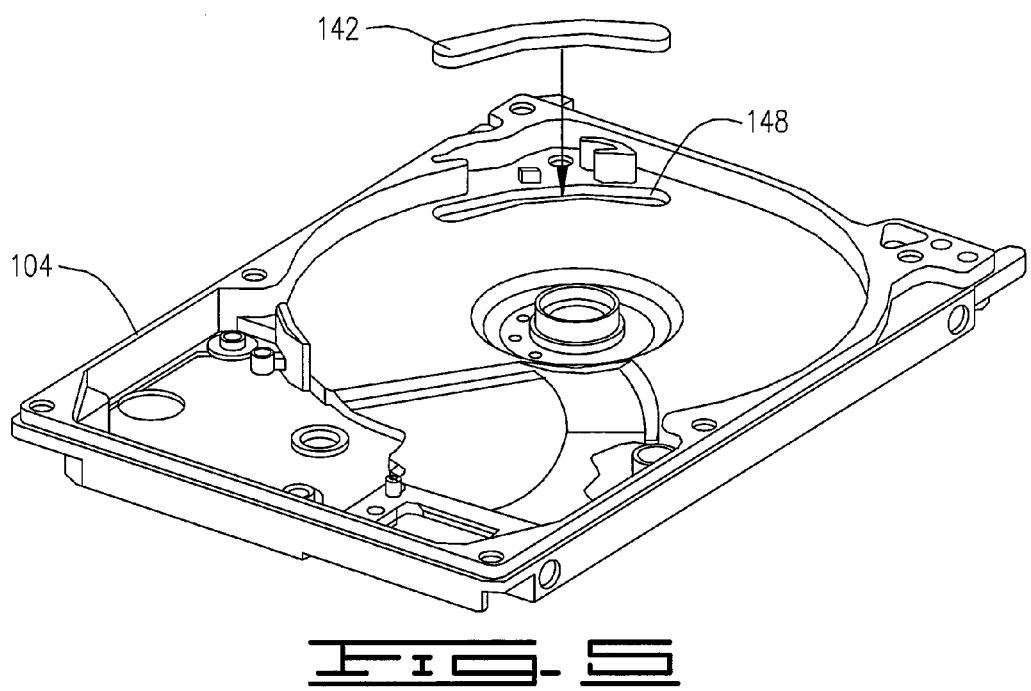
FIG. 5 is a perspective view of the base deck showing the cavity track in which the snubber is formed.

FIG. 5 is another view of the base plate 104 in which the snubber 142 is shown lifted above the surface of the base plate. A cavity track 148 has been formed in the base plate to form a retention track for the snubber 142, which will be formed along the length of the cavity track 148. With the lower portion of the snubber 142 filling the cavity track 148, the snubber 142 will be more securely affixed to the base plate 104.

FIG. 6 depicts the preferred embodiment of the present invention in which a test routine 150 is shown. The initial step 152 is to determine the types of disc defects that are being experienced and reported from field users of the disc drives. The next step 154 is to design a test that will replicate the defect history in a lab setting. This design phase will include analyzing test imparted defects to identify the defect signature and assure that it comports with the defect signatures of disc drives that are corrupted in field usage. Once this has been achieved, the next step 156 is to install a prospective protective snubber at a potential location that will prevent the defect. The test disc drive, at step 158, is subjected to the test to determine whether the user reported defect has been prevented by the snubber. If no at 162, step 158 is repeated with a snubber at another potential location, and steps 156 and 158 are repeated until at 162 the result is positive, that is, the user reported defect is prevented.

Once an acceptable location or locations have been determined by the test routine 150 of FIG. 6, various sizes of snubbers can be determined by repeating steps 154 through 158 until an optimum snubber is determined.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the snubber assembly without departing from the spirit and scope of the present invention.

In addition, although the embodiments described herein are directed to the prevention of defects for a disc drive data storage device, it will be appreciated by those skilled in the art that the defect determination and prevention taught herein can be used for other types of data storage devices, including optical drives and magneto-optical drives, without departing from the spirit and scope of the claimed invention.

What is claimed is:

1. A data storage device, comprising:
   a housing member which supports a data storage medium rotated about a central rotational axis during an operational mode, the housing member having a base surface in facing relation to the medium and substantially normal to the central rotational axis;
   a load/unload ramp structure which supports a data transducer adjacent the medium during a non-operational mode; and
   a snubber extending from the base surface which prevents contact between the medium and the ramp structure responsive to deflection of the medium from application of a mechanical shock to the data storage device.

2. The data storage device of claim 1 in which the snubber is characterized as a single elongated snubber having an overall arcuate length of approximately 60 degrees.

3. The data storage device of claim 2 in which the single elongated snubber is located 180 degrees opposite the ramp structure so that the central rotational axis of the medium intersects a line passing through the snubber and the ramp structure.

4. The data storage device of claim 1 in which the snubber is made of a formed-in-place-gasket (FIPG) material.

5. The data storage device of claim 1 in which the housing member further comprises a cavity track comprising an arcuate recess which extends into the base surface and the snubber is formed with a lower portion extending into the cavity track.

6. The data storage device of claim 1 in which a clearance gap of about 0.020 inches is provided between the medium and the snubber.

7. The data storage device of claim 1, in which the ramp structure is formed of a first material, and the snubber is formed of a second material different from the first material.

8. The data storage device of claim 1, in which the snubber is positioned on the base surface in a location responsive to user reported defects.

9. The data storage device of claim 1, further comprising a plurality of additional snubbers affixed to the base surface in spaced apart relation and extending in a direction toward the medium to limit deflection of the medium responsive to said mechanical shock.

10. A data storage device component comprising a housing member and a snubber contactingly affixed to the housing member, the housing member adapted to support a rotatable data storage medium and to support a load/unload ramp structure adapted to unload a data transducer from the storage medium, the snubber disposed between the housing member and the medium to prevent contact between the medium and the ramp structure responsive to deflection of the medium from application of a mechanical shock.

11. The data storage device component of claim 10, in which the snubber is characterized as a single elongated snubber having an overall arcuate length of less than about 60 degrees and disposed 180 degrees opposite the ramp structure so that a central rotational axis about which the medium rotates extends through a straight line that intersects the ramp structure and the snubber.

12. The data storage component of claim 10, in which the snubber is characterized as a single elongated snubber having an overall arcuate length of approximately 60 degrees with respect to a central rotational axis of the medium.

13. The data storage component of claim 10, in which the housing member comprises a base surface that extends in facing relation in a direction substantially normal to a central rotational axis about which the medium rotates, and the snubber extends from the base surface in a direction toward the medium.

14. The data storage component of claim 13, in which the base surface comprises a cavity track formed therein to provide a recessed surface on which snubber is formed using formed-in-place-gasket (FIPG) material.

15. The data storage device component of claim 10, in which the ramp structure is formed of a first material, and the snubber is formed of a second material different from the first material.

16. The data storage device component of claim 10, in which the snubber is positioned on the base surface in a location responsive to user reported defects.

17. A data storage device which incorporates the data storage device component of claim 10.

18. A data storage device, comprising:
   first and second housing members adapted to form a sealed enclosure for the device;
   a moveable transducer supported adjacent a rotatable data storage medium within the enclosure;
   a load/unload ramp structure supported within the enclosure adjacent an outermost diameter of the medium, the ramp structure adapted to contactingly support the transducer responsive to a transition of the device to a non-operational mode; and
   a snubber having a limit surface adapted to limit mechanical deflection of the medium through contact with a single surface of the medium to prevent contact between the medium and the ramp structure responsive to application of a mechanical shock to the device, the snubber being the only snubber within said sealed enclosure.

19. The data storage device of claim 18, in which the base surface comprises a recessed cavity track, and the snubber is disposed within and extends out of the recessed cavity track in a direction toward the medium.

20. The data storage device of claim 18, in which the snubber is characterized as an elongated snubber which has an overall arcuate extent of about 60 degrees and is disposed on a side of a central rotational axis of the medium opposite the ramp structure.

* * * * *